(12) United States Patent
Dreiling et al.

(10) Patent No.: US 12,484,032 B2
(45) Date of Patent: Nov. 25, 2025

(54) SYSTEM AND METHOD FOR BANDWIDTH MANAGEMENT BASED ON UE CAPABILITY

(71) Applicant: T-Mobile Innovations LLC, Overland Park, KS (US)

(72) Inventors: Ryan Patrick Dreiling, Shawnee, KS (US); Christopher Bailey, Overland Park, KS (US); Tyler Mansfield, Milwaukie, OR (US)

(73) Assignee: T-Mobile Innovations LLC, Overland Park, KS (US)

( * ) Notice: Subject to any disclaimer, the term of this patent is extended or adjusted under 35 U.S.C. 154(b) by 445 days.

(21) Appl. No.: 17/674,186

(22) Filed: Feb. 17, 2022

(65) Prior Publication Data

US 2023/0262670 A1    Aug. 17, 2023

(51) Int. Cl.
*H04W 72/0453* (2023.01)
*H04W 8/24* (2009.01)

(52) U.S. Cl.
CPC ........ *H04W 72/0453* (2013.01); *H04W 8/24* (2013.01)

(58) Field of Classification Search
CPC ............................ H04W 72/0453; H04W 8/24
See application file for complete search history.

(56) References Cited

U.S. PATENT DOCUMENTS

| | | | |
|---|---|---|---|
| 10,779,223 B2 | 9/2020 | Yang et al. | |
| 12,052,186 B2* | 7/2024 | Sun | H04W 8/24 |
| 2014/0010170 A1* | 1/2014 | Das | H04W 36/24 |
| | | | 370/329 |
| 2015/0085681 A1* | 3/2015 | Bowdery | H04W 24/02 |
| | | | 370/252 |
| 2016/0198486 A1* | 7/2016 | Moshavi | H04W 72/12 |
| | | | 455/450 |
| 2017/0171902 A1* | 6/2017 | Tillman | H04W 76/16 |
| 2018/0160298 A1 | 6/2018 | Wang et al. | |
| 2018/0206113 A1* | 7/2018 | He | H04W 8/24 |
| 2018/0279309 A1* | 9/2018 | Takahashi | H04J 11/00 |
| 2019/0159049 A1* | 5/2019 | Kim | H04B 7/0417 |
| 2019/0200406 A1* | 6/2019 | Henttonen | H04W 76/15 |
| 2019/0363843 A1* | 11/2019 | Gordaychik | H04L 1/08 |
| 2020/0036438 A1* | 1/2020 | Kim | H04B 7/0669 |
| 2020/0128479 A1* | 4/2020 | Xu | H04W 76/30 |
| 2020/0221290 A1* | 7/2020 | Wiemann | H04W 8/24 |
| 2020/0229076 A1* | 7/2020 | Jin | H04W 8/24 |
| 2020/0229175 A1* | 7/2020 | Li | H04W 72/543 |
| 2020/0313731 A1* | 10/2020 | Pals | H04W 8/24 |
| 2020/0322785 A1* | 10/2020 | Jia | H04W 48/16 |
| 2021/0014167 A1* | 1/2021 | Feng | H04L 47/25 |
| 2021/0281373 A1* | 9/2021 | Liu | H04L 5/0051 |
| 2021/0320697 A1* | 10/2021 | Gopal | H04B 1/38 |
| 2021/0400755 A1* | 12/2021 | Van Der Velde | H04W 72/0453 |

(Continued)

*Primary Examiner* — Blake J Rubin
(74) *Attorney, Agent, or Firm* — Jones Robb, PLLC (57) ABSTRACT

Systems, methods, and process nodes for managing bandwidth in a telecommunications network include or implement operations of receiving a connection request from a wireless communication device capable of communication in a first band having a first frequency and in a second band having a second frequency; receiving a capability report from the wireless communication device; and in response to a determination that the capability report meets a criteria, assigning the wireless communication device to communicate in the second band.

17 Claims, 4 Drawing Sheets

(56) References Cited

U.S. PATENT DOCUMENTS

| | | | |
|---|---|---|---|
| 2022/0039047 A1* | 2/2022 | Tsai | H04W 8/24 |
| 2022/0191766 A1* | 6/2022 | Li | H04W 48/16 |
| 2022/0264589 A1* | 8/2022 | Sun | H04W 72/54 |
| 2022/0322388 A1* | 10/2022 | Takeda | H04W 72/51 |
| 2023/0049913 A1* | 2/2023 | Kim | H04W 36/362 |
| 2023/0087902 A1* | 3/2023 | Zheng | H04W 8/22 |
| | | | 370/329 |
| 2023/0111064 A1* | 4/2023 | Rahman | H04B 7/0404 |
| | | | 370/252 |
| 2023/0422103 A1* | 12/2023 | Kim | H04W 36/00835 |
| 2024/0064786 A1* | 2/2024 | Jin | H04W 72/51 |
| 2024/0097836 A1* | 3/2024 | Wang | H04L 5/0053 |
| 2024/0147402 A1* | 5/2024 | Wu | H04W 60/005 |
| 2024/0284484 A1* | 8/2024 | Zhang | H04L 1/0061 |
| 2024/0364390 A1* | 10/2024 | Cao | H04W 52/0229 |

\* cited by examiner

SYSTEM AND METHOD FOR BANDWIDTH MANAGEMENT BASED ON UE CAPABILITY

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Various portions of the electromagnetic spectrum have been allocated to wireless telecommunications. For example, 4G LTE communication utilizes frequencies below 6 gigahertz (GHz), and 5G NR communication utilizes frequencies below 6 GHz (Frequency Range 1) and above 24 GHz (Frequency Range 2). These frequencies are further divided into a plurality of bands, some of which may overlap, depending on the RAT. For example, LTE spectrum includes Band 2, corresponding to uplink frequencies between 1920 megahertz (MHz) and 1980 MHz and downlink frequencies between 2110 MHz and 2170 MHz; Band 5, corresponding to uplink frequencies between 824 MHz and 849 MHz and downlink frequencies between 869 MHz and 894 MHz; Band 4, corresponding to uplink frequencies between 1710 MHz and 1755 MHz and downlink frequencies between 2110 MHz and 2155 MHz; and so on. Generally speaking, due to inherent characteristics of electromagnetic radiation, lower-frequency bands provide longer-range communication and/or increased signal penetration whereas higher-frequency bands provide faster data rates and/or increased capacity.

An individual RAT may encompass several different categories described by, for example, UE capabilities or requirements. For example, the 3rd Generation Partnership Project (3GPP) defines more than twenty categories of LTE UEs in which each category corresponds to a maximum downlink (DL) data rate, a maximum number of DL multiple-input multiple-output (MIMO) layers, a maximum uplink (UL) data rate, and so on. A network may simultaneously provide service to a large number of devices belonging to or supporting different RAT categories, and may implement layer management strategies to direct UEs to particular bands.

Overview

Various aspects of the present disclosure relate to systems and methods of managing bandwidth and device connections in a network, such as managing which devices connect to the network on which bands based on UE capabilities.

In one exemplary aspect of the present disclosure, a method of managing bandwidth in a telecommunications network comprises: receiving a connection request from a wireless communication device capable of communication in a first band having a first frequency and in a second band having a second frequency; receiving a capability report from the wireless communication device; and in response to a determination that the capability report meets a criteria, assigning the wireless communication device to communicate in the second band.

In another exemplary aspect of the present disclosure, a telecommunications system comprises: an access node; and a wireless communication device configured to communicate with a network including a plurality of bands via the access node, wherein the access node is configured to: receive a capability report from a wireless device, the capability report including of a list of bands supported by the wireless communication device among the plurality of bands, compare the capability report to a set of criteria, and in response to a determination that the capability report meets the set of criteria, assign the wireless communication device to communicate using a first band selected from the list of bands.

In another exemplary aspect of the present disclosure, a processing node for managing bandwidth in a telecommunications network comprises: a memory; and a processor configured to perform operations comprising: receiving a capability report from a wireless communication device, the capability report including at least one of a list of bands supported by the wireless communication device, a list of features supported by the wireless communication device, and a list of radio access technology (RAT) categories supported by the wireless communication device, compare the capability report to a set of criteria, and in response to a determination that the capability report meets the set of criteria, assign the wireless communication device to communicate using a first band selected from the list of bands.

In this manner, these and other aspects of the present disclosure provide for improvements in at least the technical field of telecommunications, as well as the related technical fields of network connection management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

As noted above, a network may simultaneously provide service to a large number of wireless devices belonging to or supporting different RAT categories. To coordinate communications, the network may invoke layer management strategies to direct UEs to particular bands. Moreover, as noted above, lower-frequency bands tend to provide longer-range communication and/or increased signal penetration whereas higher-frequency bands tend to provide faster data rates and/or increased capacity. However, some UEs may inherently (e.g., due to factors such as the form factor of the device, power conservation features or modules of the device, device cost, etc.) exhibit reduced capabilities or performance such that they would not benefit from the faster data rates and/or increased capacity of higher-frequency bands. For example, an LTE-enabled smartwatch, restricted by the form factor of the device, may exhibit poorer RF performance compared to low-to-mid-tier handsets. Thus, if smartwatch devices are assigned according to the same layer management strategies as other, more capable wireless devices, the device assignment scheme may result in an inefficient use of limited frequency resources. For example, smartwatch devices assigned to higher-frequency bands may result in increased traffic congestion, increased noise, and/or reduced bandwidth for other connected devices, while not benefiting from the faster data rates and/or higher capacity of the band.

In accordance with various aspects of the present disclosure, systems, methods, and processing nodes are provided to ensure that devices are assigned to bands which better suit the capability of the devices. For example, wireless devices may be assigned to particular bands based on the capabilities and/or limitations of the wireless device. Thus, the present disclosure provides systems, methods, and processing nodes which may reduce overall noise, interference, latency, and the like.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. A wireless device may have various capabilities, such as a maximum DL data rate, a maximum UL data rate, support for particular bands, features, and technologies, and so on.

For LTE, the approximate maximum DL data rate, the maximum DL MIMO layers, and the maximum UL data rate are set forth in Table 1. Thus, for example, the UE capabilities a device which supports LTE Category 1 ("Cat 1") are a maximum DL data rate of 10.3 Megabit per second (Mb/s), a maximum of 1 DL MIMO layers, and a maximum UL data rate of 5.2 Mb/s. LTE Categories in Table 1 are considered "lower" the higher they are in the table; thus, LTE Cat M2 is a lower category than LTE Cat 0, which in turn is a lower category than LTE Cat 1. For convenience, only categories LTE Cat NB1 to LTE Cat 8 are shown; however, the categories may extend up to LTE Cat 19 or higher and additional categories may be defined in future releases of technology specifications.

TABLE 1

| UE Cat | Max DL rate (Mb/s) | Max DL MIMO layers | Max UL rate (Mb/s) |
|---|---|---|---|
| NB1 | 0.03 | 1 | 0.06 |
| NB2 | 0.08 | 1 | 0.1 |
| M1 | 1 | 1 | 1 |
| M2 | 4 | 1 | 7 |
| 0 | 1 | 1 | 1 |
| 1 | 10 | 1 | 5 |
| 2 | 50 | 2 | 25 |
| 3 | 100 | 2 | 50 |
| 4 | 150 | 2 | 50 |
| 5 | 300 | 4 | 75 |
| 6 | 300 | 2 or 4 | 50 |
| 7 | 300 | 2 or 4 | 100 |
| 8 | 3000 | 8 | 1500 |

For NR, UE capabilities may not necessarily be denoted by numbered RAT categories but instead by capability set names. For example, a device may be denoted a NR Reduced Capability (RedCap) device. In Frequency Range 1, compared to a baseline device which may support a maximum bandwidth of 100 MHz, up to 4 DL MIMO layers, a maximum DL modulation order (Quadrature Amplitude Modulation or QAM) of 256 QAM, etc., a NR RedCap device may support a maximum bandwidth of 20 MHz, up to 2 DL MIMO layers, a maximum DL modulation order of 64 QAM, etc. In Frequency Range 2, compared to a baseline device which may support a maximum bandwidth of 200 MHz, up to 2 DL MIMO layers, a maximum DL modulation order of 64 QAM, etc., a NR RedCap device may support a maximum bandwidth of 100 MHz, 1 DL MIMO layer, a maximum DL modulation order of 64 QAM, etc.

The capabilities of a wireless device may be included in a capability report generated and/or transmitted by the wireless device. A capability report in accordance with the present disclosure may be, for example, an LTE UE Capability Information message or an NR UE Capability Information message. The capability report is a type of Radio Resource Control (RRC) message transmitted from a wireless device to a network entity (e.g., an access node) in response to a UE Capability Enquiry message. The capability report message includes several fields, including but not limited to: a list of RAT capabilities supported by the wireless device, which may include a list of supported features (e.g., Evolved Universal Mobile Telecommunications System Terrestrial Radio Access (E-UTRA) support, frequency-division duplexing (FDD) and/or time-division duplexing (TDD) support, NR RedCap support, etc.); a list of RAT categories supported by the wireless device and/or an identification of the highest RAT category (e.g., LTE Cat 1, etc.); a list of frequency bands supported by the wireless device; a list of communication parameters supported by the wireless device (e.g., maximum DL or UL rates, a maximum number of antennas included in the wireless device, etc.). In some implementations, the capability report may combine certain fields; for example, the capability report may omit an express field for the one or more items of the list of communication parameters and instead use the list of RAT categories and/or identification of the highest RAT category to infer the omitted parameters.

For purposes of illustration and explanation, various portions of this detailed description refer to a system in which the RAT is LTE; however, the present disclosure is not so limited. The systems and methods described herein may be implemented in any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

Figure 1:
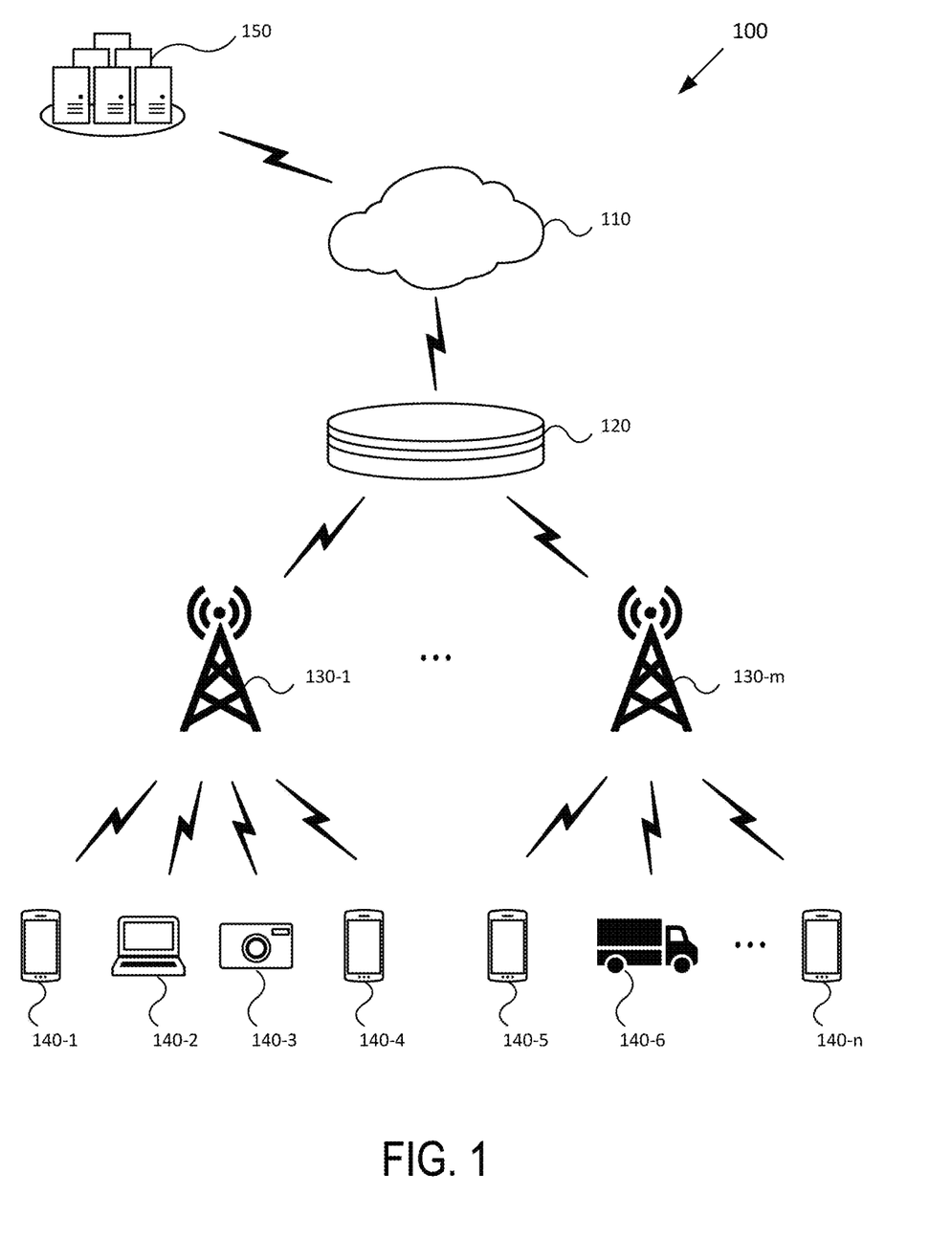
FIG. 1 illustrates an exemplary system for wireless communication in accordance with various aspects of the present disclosure.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an LTE cloud platform, may perform processing and forward results to the computing systems and devices 150 and/or the wireless devices 140. The core network 120, which may be an LTE core network, connects with the cloud platform 110 and the access nodes 130. For LTE communication, the core network 120 may be implemented on a fixed-function, hardwired architecture. Examples of the core network and/or the access nodes 130 will be described in more detail below with respect to FIGS. 2 and 3.

The wireless devices 140 are devices configured with appropriate technologies for connecting to the cloud platform 110. The wireless devices 140 may be or include mobile communication devices such as smartphones, laptop computers, tablet computers, wearable devices, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
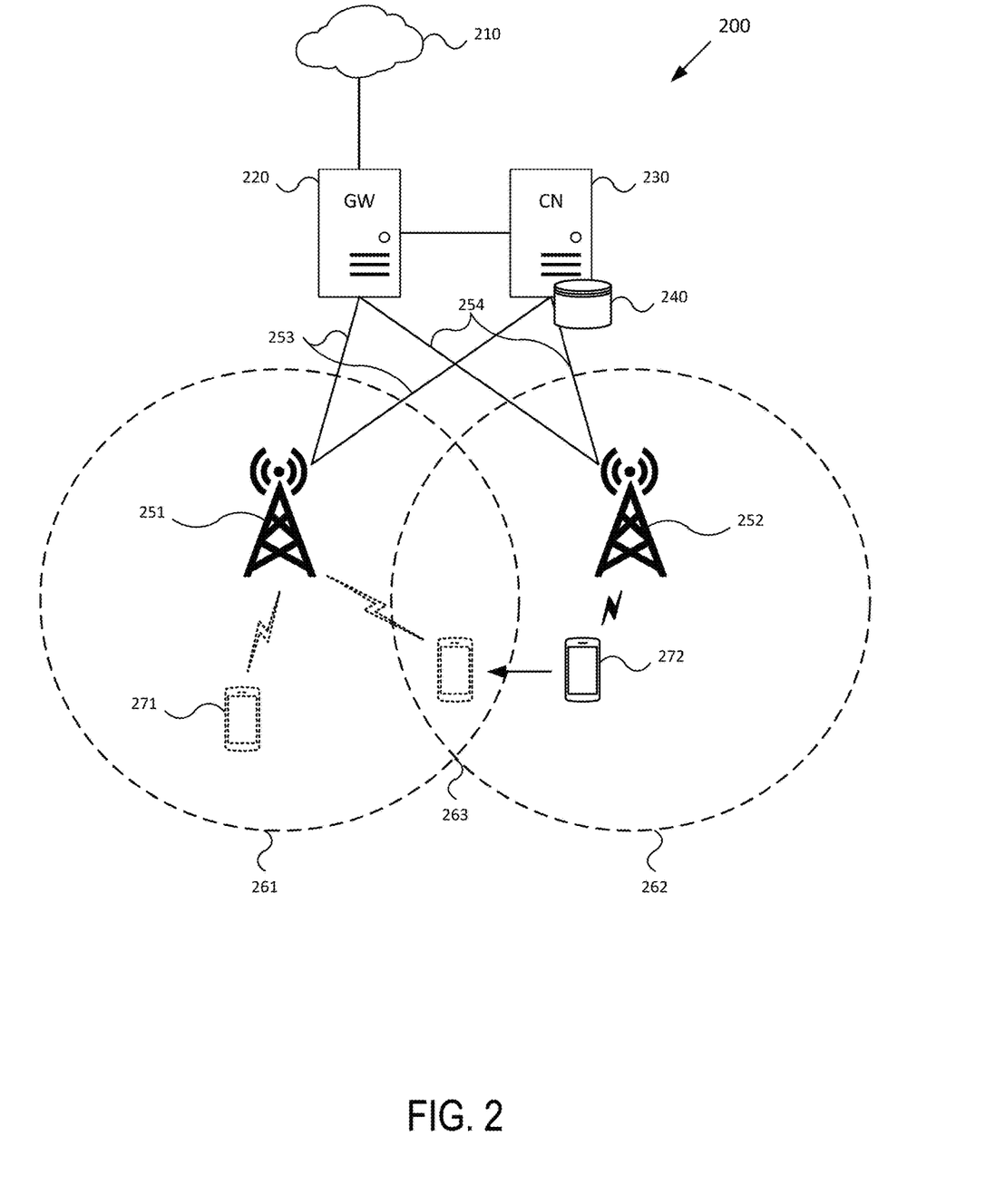
FIG. 2 illustrates an exemplary configuration of a system for wireless communication in accordance with various aspects of the present disclosure

FIG. 2 illustrates a configuration for an exemplary system 200 in accordance with various aspects of the present disclosure. As illustrated, the system 200 comprises a communication network 210, a gateway node 220, a controller node 230 which includes a database 240, a first access node 251, a second access node 252, a first wireless devices 271, and a second wireless device 272. For purposes of illustration and ease of explanation, only two access nodes and two wireless devices are shown; however, as noted above with regard to FIG. 1, additional access nodes and/or additional or fewer wireless devices may be present in the system 200. In the illustration of FIG. 2, the first access node 251 and the second access node 252 each communicate with the gateway node 220 and the controller node 230 via communication links 253 and 254, respectively. Thus, FIG. 2 illustrates an example in which the first access node 251 and the second access node 252 utilize the same network infrastructure. However, in other examples, the first access node 251 and the second access node 252 may communicate with separate gateway nodes and/or controller nodes, and therefore utilize separate network infrastructure. The first access node 251 and the second access node 252 may further be configured to communicate with one another and/or with other access nodes using a direct link (e.g., an X2 link or the like). Moreover, while FIG. 2 illustrates an example in which the system 200 provides LTE service via the gateway node 220 and the controller node 230, the system 200 may additionally or alternatively provide NR service via a 5G core.

The first access node 251 is configured to provide service in a first coverage area 261. The second access node 252 is configured to provide service in a second coverage area 262. While the first coverage area 261 and the second coverage area 262 are illustrated as being substantially similar in size for purposes of illustration and explanation, in some implementations the first coverage area 261 and the second coverage area 262 may be differently sized or shaped. Moreover, while the first coverage area 261 and the second coverage area 262 are illustrated as having separate coverage areas and a common coverage area 263, in some implementations one of the first coverage area 261 and the second coverage area 262 may be subsumed within the other or the first coverage area 261 and the second coverage area 262 may be congruent. The first access node 251 and/or the second access node 252 may provide additional coverage areas corresponding to different RATs (such as 4G and/or 5G RATs), different frequency bands, and so on.

A scheduling entity may be located within the first access node 251, the second access node 252, and/or the controller node 230, and may be configured to receive connection request, assign devices to particular bands, and/or manage bandwidth, as will be described in more detail below. The first access node 251 and/or the second access node 252 may be any network node configured to provide communications between the wireless devices and the communication network 210, including standard access nodes and/or short range, lower power, small access nodes. As examples of a standard access node, the first access node 251 and/or the second access node 252 may be a macrocell access node, a base transceiver station, a radio base station, a gNodeB in 5G networks, an eNodeB in 4G/LTE networks, or the like, including combinations thereof. In one particular example, the first access node 251 and/or the second access node 252 may be a macrocell access node in which a respective range of the first coverage area 261 and/or the second coverage area 262 is from approximately five to thirty-five kilometers (km) and in which the output power is in the tens of watts (W). As examples of a small access node, the first access node 251 and/or the second access node 252 may be a microcell access node, a picocell access node, a femtocell access node, or the like, including a home gNodeB or a home eNodeB.

The first access node 251 and/or the second access node 252 can comprise one or more processors and associated circuitry to execute or direct the execution of computer-readable instructions such as those described herein. In so doing, the first access node 251 and/or the second access node 252 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the first access node 251 and/or the second access node 252 can receive instructions and other input at a user interface.

Figure 3:
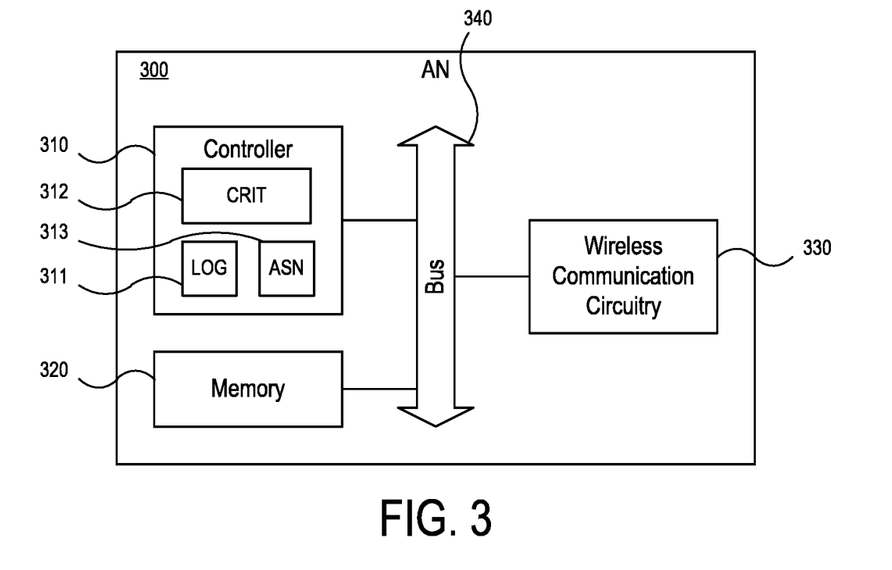
FIG. 3 illustrates an exemplary access node in accordance with various aspects of the present disclosure.

FIG. 3 illustrates one example of an access node 300, which may correspond to one or more of the access nodes 130 shown in FIG. 1 and/or the first and/or second access node 251/252 shown in FIG. 2. As illustrated the access node 300 includes a controller 310, a memory 320, wireless communication circuitry 330, and a bus 340 through which the various elements of the access node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like, or combinations thereof.

Thus, the access node 300 may implement a system and/or method to manage device connections and band assignments in a telecommunications network associated with the access node 300. The access node 300 may provide service via a network having one or more bands each having different frequencies. The wireless communication circuitry 330 may be configured to receive a connection request from a wireless device seeking to join the network, in which the wireless device is capable of communication in at least a first band and a second band. The connection request may further include a capability report of the wireless device or be followed by the capability report. The capability report may be or include capability-identifying information of the wireless device which the access node 300 may use for the determination. This information includes, but is not limited to: a list of RAT capabilities supported by the wireless device, which may include a list of supported features (e.g., E-UTRA support, FDD and/or TDD support, NR RedCap support, etc.); a list of RAT categories supported by the wireless device and/or an identification of the highest RAT category (e.g., LTE Cat 1, etc.); a list of frequency bands supported by the wireless device; a list of communication parameters supported by the wireless device (e.g., maximum DL or UL rates, a maximum number of antennas included in the wireless device, etc.). In some implementations, the capability report may combine certain fields; for example, the capability report may omit an express field for the one or more items of the list of communication parameters and instead use the list of RAT categories and/or identification of the highest RAT category to infer the omitted parameters.

The controller 310 includes a logic unit 311, which may be configured to compare the capability report to a predetermined criteria that is loaded to (e.g., from the memory 320) or stored in a criteria unit 312. The predetermined criteria may be, for example, whether a highest RAT category in a list of RAT categories supported by the wireless device is less than or equal to a predetermined value; whether a maximum DL data rate and/or maximum UL data rate supported by the wireless device is less than a threshold rate; whether a number of antennas (e.g., MIMO antenna layers) included in the wireless device is less than a threshold number, and so on. The controller 310 further includes a band assignment unit 313 which may assign the wireless device to communicate in a particular band based on an output of the logic unit 311. For example, in response to a determination that the capability report meets the predetermined criteria, the band assignment unit 313 may assign the wireless device to communicate in a particular band (e.g., a band having a lower frequency from among the first band and the second band, or the band having the lowest frequency among bands in which the wireless device may communicate).

The logic unit 311, the criteria unit 312, and the band assignment unit 313 are illustrated as residing within the controller 310 for ease of explanation; however, one or more of the units may instead reside within the memory 320 and/or may be provided as separate units within the access node 300. Moreover, while the logic unit 311, the criteria unit 312, and the band assignment unit 313 are illustrated as separate units, in practical implementations some or all of the units may be combined and/or share components.

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive connection requests via the wireless communication circuitry 330 and output connection determinations via the wireless communication circuitry 330, thereby allowing or denying the connection requests. The access node 300 may include additional wireless communication circuitry elements, for example to communicate using and/or to provide connectivity for different RATs. The access node 300 may further include additional wired communication circuitry elements.

Returning to FIG. 2, various wireless devices may be present in one or both of the first coverage area 261 and the second coverage area 262, may become present in one or both of the first coverage area 261 and the second coverage area 262, may move from one coverage area to another, and/or may move from one coverage area to a common coverage area 263 of the first coverage area 261 and the second coverage area 262. Two cases in particular are illustrated in FIG. 2. The first wireless device 271 is illustrated with a dotted line to show that it may become introduced into the system 200 (e.g., by powering on or waking from a sleep mode). Upon introduction into the system 200, the first wireless device 271 may submit a connection request to the first access node 251 (referred to as a "initial attach request"). The second wireless device 272 is illustrated with a solid line to show that it is currently present in system 200 and located in the second coverage area 262, and also with a dotted line to show that it may be mobile and move into the common coverage area 263. Upon entering the common coverage area 263, the second wireless device 272 may submit a connection request to the first access node 251 via the second access node 252 (referred to as a "handover request").

Figure 4:
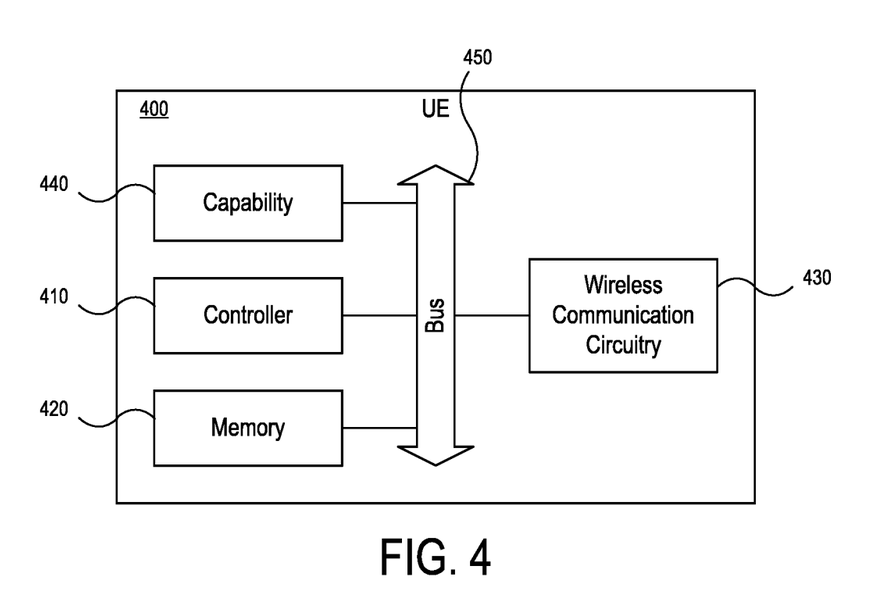
FIG. 4 illustrates an wireless communication device in accordance with various aspects of the present disclosure.

FIG. 4 illustrates one example of a wireless device 400 (i.e., a UE), which may correspond to one or more of the wireless devices 140 shown in FIG. 1 and/or the first wireless device 271 and/or the second wireless device 272 shown in FIG. 2. As illustrated the wireless device 400 includes a controller 410, a memory 420, a wireless communication circuitry 430, a capability component 440, and a bus 450 through which the various elements of the wireless device 400 communicate with one another. The capability component 440 may include storage media to store information related to the capability of the wireless device 400; for example, a capability report. The capability component 440 may be a portion of controller 410 or the memory 420, or may be a separate storage area from the controller 410 and the memory 420, such as a SIM card separate from a main memory of the wireless device 400.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses (e.g., connection acceptance messages, connection rejection messages, band assignment messages, etc.) via the wireless communication circuitry 430, the responses indicating whether the connection requests have been accepted or denied. The wireless device 400 may also be configured to transmit the capability report from the capability component 440 via the wireless communication circuitry 430. The wireless device 400 may include additional wireless communication circuitry elements, for example to communicate using different RATs.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links 253 and 254 may respectively use various communication media, such as air, space, metal, optical fiber, other signal propagation paths, and combinations thereof. The communication links 253 and 254 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 253 and 254 may respectively be a direct link or might include various equipment, intermediate components, systems, and networks. The communication links 253 and 254 may comprise many different signals sharing the same link.

The gateway node 220 may be any network node configured to interface with other network nodes using various protocols. The gateway node 220 can communicate user data over the system 200. The gateway node 220 may be a standalone computing device, computing system, or network component, and can be accessible by, for example, a wired or wireless connection, or through an indirect connection such as via a computer network or communication network. The gateway node 220 may include but is not limited to a serving gateway (SGW) and/or a public data network gateway (PGW). Additionally or alternatively, the gateway node 220 may include user plane network functions (NFs), such as a User Plane Function (UPF). The gateway node 220 is not limited to any specific technology architecture, such as LTE or 5G NR, but may be used with any network architecture and/or protocol.

The gateway node 220 can comprise a processor and associated circuitry to execute or direct the execution of computer-readable instructions to obtain information. In so doing, the gateway node 220 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 220 can receive instructions and other input at a user interface.

The controller node 230 may be any network node configured to communicate and/or control information over the system 200. The controller node 230 may be configured to transmit control information associated with resource usage thresholds and/or usage parameters. The controller node 230 may be a standalone computing device, computing system, or network component, and can be accessible by, for example, a wired or wireless connection, or through an indirect connection such as via a computer network or communication network. The controller node 230 may include but is not limited to an MME, a HSS, a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 230 may comprise user plane NFs and/or control plane NFs, including but not limited to a Core Access and Mobility management Function (AMF), an Authentication Server Function (AUSF), a Unified Data Management (UDM), a Session Management Function (SMF), a Policy Control Function (PCF), an Application Function (AF), a Network Exposure Function (NEF), a NF Repository Function (NRF), a Network Slice Selection Function (NSSF), a Short Message Service Function (SMSF), and the like. The controller node 230 is not limited to any specific technology architecture, such as LTE or 5G NR, but may be used with any network architecture and/or protocol.

The controller node 230 can comprise a processor and associated circuitry to execute or direct the execution of computer-readable instructions to obtain information. In so doing, the controller node 230 can retrieve and execute software from storage, which can include a disk drive, a flash drive, memory circuitry, or some other memory device, and which may be local or remotely accessible. As illustrated in FIG. 2, the controller node 230 includes the database 240 for storing information, such as predetermined resource usage thresholds utilized for dynamically managing RATs of the first and/or second wireless devices 271/272, as well as positions and/or characteristics of the first and/or second wireless devices 271/272. The database 240 may further store handover thresholds, scheduling schemes, and resource allocations for the first and/or second access nodes 251/252, the first and/or second wireless devices 271/272, and so on. This information may be requested or shared with the first and/or second access nodes 251/252 via the communication link 254, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 230 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access nodes 250 and communication network 210.

Figure 5:
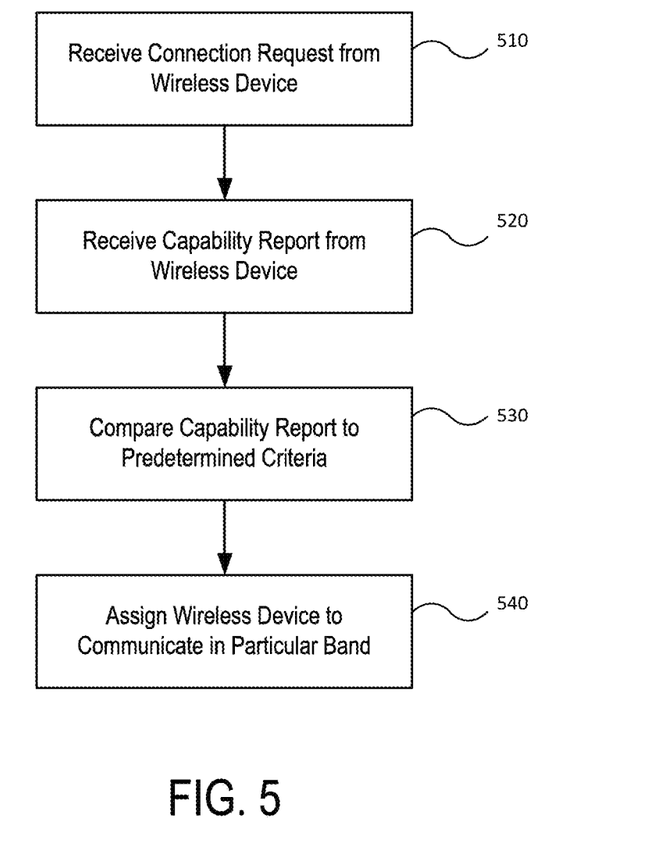
FIG. 5 illustrates an exemplary process flow for managing device connections in accordance with various aspects of the present disclosure.

Devices or systems in accordance with various aspects of the present disclosure may perform various operations to manage bandwidth and/or connections. An exemplary method including these operations is illustrated in FIG. 5. The method of FIG. 5 may be triggered by various events, such as a ping received from a wireless device, or may be triggered upon receipt of a communication request as will be described in more detail below. For purposes of explanation, the method of FIG. 5 will be described as being performed in the access node 300 and as corresponding to the wireless device 400; however, this is merely exemplary and not limiting.

FIG. 5 illustrates an exemplary method in the general case of a wireless device requesting to join a network. At operation 510, the access node 300 receives a connection request from the wireless device 400. The wireless device 400 may be a UE that is capable of communication in a first band having a first frequency and in a second band having a second frequency which may be, for example, lower than the first frequency. The connection request may include a capability report of the wireless device 400 or may be followed by the capability report. For example, in response to the connection request, the access node 300 may send a capability report enquiry to the wireless device 400, which may respond with the capability report. Thus, whether the capability report is included with the connection request or sent separately, at operation 520 the access node 300 receives the capability report from the wireless device 400. At operation 530, the access node 300 compares a capability report of the wireless device to a predetermined criteria or set of criteria. In response to a determination at operation 530 that the capability report meets the predetermined criteria, at operation 540 the access node 300 then assigns the wireless device 400 to communicate in a particular band (e.g., in the lower-frequency band from among the first band and the second band, or the lowest-frequency band from among all bands supported by the wireless device 400).

The connection request may be an initial attach request (e.g., as in the first wireless device 271 shown in FIG. 2) or a handover request (e.g., as in the second wireless device 272). In other implementations, the device assignment operations may be performed not in response to a connection request but in response to another event (e.g., a ping from a device, at a predetermined interval, in response to a determination that network traffic or latency surpasses a threshold, an RRC Connection request, other post-attach procedures, etc.). In such implementations, operations 520-540 may be performed in response to said event and operation 510 may be omitted.

The capability report may include a list of RAT categories supported by the wireless device 400, and the predetermined criteria may be that a highest RAT category in the list of RAT categories supported by the wireless device 400 is less than or equal to a predetermined value (e.g., LTE Cat 1). The capability report may additionally or alternatively directly include information regarding the connection potential of the wireless device 400. For example, the capability report may include a maximum download rate or a maximum upload rate supported by the wireless device 400, in which case the predetermined criteria may be that the maximum download rate or a maximum upload rate supported by the wireless device 400 is less than a threshold rate. Additionally or alternatively, the capability report may include a number of antennas included in the wireless device 400 (e.g., max DL MIMO layers), in which case the predetermined criteria may be that the number of antennas included in the wireless device 400 is less than a threshold number (e.g., the number of antennas is less than two or is equal to one).

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing bandwidth in a telecommunications network, the method comprising:
   receiving a connection request from a wireless communication device capable of communication in a first band having a first frequency and in a second band having a second frequency, wherein the connection request is an initial attach request or a handover request;
   receiving a capability report from the wireless communication device, wherein the capability report includes:
      a maximum download rate or a maximum upload rate supported by the wireless communication device, and
      a number of antennas included in the wireless communication device; and
   in response to a determination that the capability report meets one or more criteria, wherein the one or more criteria include that the maximum download rate or a maximum upload rate supported by the wireless communication device is less than a threshold rate and the number of antennas included in the wireless communication device is less than a threshold number, assigning the wireless communication device to communicate in the second band, wherein the second frequency is lower than the first frequency.

2. The method according to claim 1, wherein the capability report includes a list of radio access technology (RAT) categories supported by the wireless communication device.

3. The method according to claim 2, wherein the one or more criteria further include that a highest RAT category in the list of RAT categories supported by the wireless communication device is less than or equal to a predetermined value.

4. A telecommunications system comprising:
   an access node; and
   a wireless communication device configured to communicate with a network including a plurality of bands via the access node, wherein the access node is configured to:
      receive a capability report from a wireless device based on an initial attach request or a handover request, the capability report identifying a maximum downlink data rate, a maximum uplink data rate, maximum downlink multiple-input multiple-output (MIMO) layers for the wireless communication device, and a number of antennas included in the wireless communication device,
      compare the capability report to a set of criteria, and
      in response to a determination that the capability report meets the set of criteria, assign the wireless communication device to communicate using a first band selected from a list of bands supported by the wireless communication device, wherein the first band is a lowest-frequency band from among the list of bands.

5. The system according to claim 4, wherein the capability report includes a list of radio access technology (RAT) categories supported by the wireless communication device.

6. The system according to claim 5, wherein the set of criteria include that a highest RAT category in the list of RAT categories supported by the wireless communication device is less than or equal to a predetermined value.

7. The system according to claim 4, wherein the access node is configured to perform the operations of receiving, comparing, and assigning in response to a connection request from the wireless communication device.

8. The system according to claim 4, wherein the access node is configured to perform the operations of receiving, comparing, and assigning repeatedly at a predetermined interval.

9. A processing node for managing bandwidth in a telecommunications network, the processing node comprising:
   a memory; and
   a processor configured to perform operations comprising:
      receiving a capability report from a wireless communication device based on an initial attach request or a handover request, the capability report including a list of bands supported by the wireless communication device, a maximum download rate or a maximum upload rate supported by the wireless communication device, and a number of antennas included in the wireless communication device, comparing the capability report and a list of radio access technology (RAT) categories-supported by the wireless capability report to a set of criteria, and in response to a determination that the capability report meets the set of criteria, wherein the set of criteria include that the maximum download rate or the maximum upload rate supported by the wireless communication device is less than a threshold rate and the number of antennas included in the wireless communication device is less than a threshold number, assigning the wireless communication device to communicate using a first band selected from the list of bands, wherein the first band is a lowest-frequency band from among the list of bands.

10. The processing node according to claim 9, wherein the set of criteria is that a highest RAT category in the list of RAT categories supported by the wireless communication device is less than or equal to a predetermined value.

11. The processing node according to claim 9, wherein the set of criteria further include that a maximum number of multiple-input multiple-output (MIMO) antenna layers of the wireless communication device is one.

12. The processing node according to claim 9, wherein the operations further comprise receiving a connection request from the wireless communication device.

13. The processing node according to claim 12, wherein the operations further comprise, in response to the connection request, transmitting a capability report enquiry to the wireless communication device.

14. The processing node according to claim 12, wherein the connection request is an attach request.

15. The method according to claim 1, wherein the capability report includes a list of radio access technology (RAT) capabilities comprising one or more supported features.

16. The system according to claim 4, wherein the capability report includes a list of radio access technology (RAT) capabilities comprising one or more supported features.

17. The processing node of claim 9, wherein the capability report includes a list of RAT capabilities comprising one or more supported features.

* * * * *